(12) United States Patent
Erlmann

(10) Patent No.: US 9,714,682 B2
(45) Date of Patent: Jul. 25, 2017

(54) JOINT YOKE FOR A UNIVERSAL JOINT AND UNIVERSAL JOINT

(71) Applicant: Spicer Gelenkwellenbau GmbH, Essen (DE)

(72) Inventor: Nikolaus Martin Erlmann, Düsseldorf (DE)

(73) Assignee: Spicer Gelenkwellenbau GmbH, Essen (DE)

( * ) Notice: Subject to any disclaimer, the term of this patent is extended or adjusted under 35 U.S.C. 154(b) by 0 days.

(21) Appl. No.: 15/182,287

(22) Filed: Jun. 14, 2016

(65) Prior Publication Data

US 2016/0363172 A1  Dec. 15, 2016

(30) Foreign Application Priority Data

Jun. 15, 2015  (DE) .................... 10 2015 109 546

(51) Int. Cl.
*F16D 3/38* (2006.01)
*F16D 3/26* (2006.01)
*F16D 3/41* (2006.01)

(52) U.S. Cl.
CPC .............. *F16D 3/387* (2013.01); *F16D 3/26* (2013.01); *F16D 3/38* (2013.01); *F16D 3/41* (2013.01)

(58) Field of Classification Search
CPC ...................................... F16D 3/387
USPC .................... 464/134, 135, 116–119, 136
See application file for complete search history.

(56) References Cited

U.S. PATENT DOCUMENTS

| 2,478,890 | A | * | 8/1949 | Barager .................... F16D 3/04 464/136 X |
| 3,321,256 | A | | 5/1967 | Orain |
| 4,412,827 | A | | 11/1983 | Petrzelka et al. |
| 5,628,578 | A | * | 5/1997 | McClanahan ........... F16D 3/387 |
| 9,239,083 | B2 | * | 1/2016 | Koyama ................. F16D 3/387 |

FOREIGN PATENT DOCUMENTS

| DE | 1122781 B | 1/1962 |
| DE | 1425952 A1 | 3/1969 |
| DE | 2900846 A1 | 10/1980 |
| DE | 3141131 A1 | 5/1983 |
| DE | 2933505 C2 | 11/1983 |
| DE | 19953963 A1 | 3/2001 |
| DE | 10303291 A1 | 8/2004 |
| EP | 0320229 A1 | 6/1989 |

(Continued)

OTHER PUBLICATIONS

German Office Action for Application No. 10 2015 109 546.7, dated May 9, 2016, issued by the German Patent and Trademark Office; translation included.

*Primary Examiner* — Gregory Binda
(74) *Attorney, Agent, or Firm* — Marshall & Melhorn, LLC

(57) ABSTRACT

A joint yoke (7, 107) for a universal joint (2) has a first yoke arm (11, 111) and a second yoke arm (12, 112). The first and second yoke arms (11, 12) have at least two recesses (33, 33', 34, 34'). The yoke arms (11, 12, 111, 112) have, radially to the axis of rotation (X), an outer portion (A) and an inner portion (B) adjacent to the outer portion (A). The wall thickness (d1) of the yoke arms (11, 12, 111, 112), in a radial direction to the bearing axis (Y) in a plane orthogonal to the axis of rotation (X) and through the joint center (M), is reduced in the outer portion relative to the inner portion (B).

7 Claims, 7 Drawing Sheets

(56) References Cited

FOREIGN PATENT DOCUMENTS

| GB | 962809 | * | 7/1964 | ................... 464/134 |
| --- | --- | --- | --- | --- |
| GB | 2040395 A | | 8/1980 | |
| GB | 2 053 417 A | * | 2/1981 | ................... 464/134 |
| GB | 2310706 A | | 9/1997 | |
| JP | 2007333189 A | | 12/2007 | |
| JP | 2014173733 A | | 9/2014 | |

\* cited by examiner

JOINT YOKE FOR A UNIVERSAL JOINT AND UNIVERSAL JOINT

CROSS-REFERENCE TO RELATED APPLICATION

This application is claiming the benefit, under 35 U.S.C. 119(a), of the German Patent Application which was granted Serial No. 102015109546 and filed on Jun. 15, 2015, the entire disclosure of which is hereby incorporated by reference.

FIELD OF INVENTION

The disclosure relates to a joint yoke for a universal joint. The joint yoke is rotatably driveable around an axis of rotation. It has a first yoke arm with a first bearing bore and a second yoke arm with a second bearing bore. The first bearing bore and the second bearing bore are centered on a bearing axis. The bearing axis intersects the axis of rotation at a right angle at a joint center. The yoke arms have, radially to the axis of rotation, an outer portion and an inner portion, adjacent to the outer portion. The wall thickness of the yoke arms, in radial direction to the bearing axis in a plane orthogonal to the axis of rotation and through the joint center, is reduced in the outer portion relative to the inner portion.

BACKGROUND OF INVENTION

A joint yoke is known from DE 29 00 846 A1. Here, the joint yoke is made from sheet metal.

Universal joints have two joint yokes. The yoke arms of the two joint yokes are connected in an articulated manner to each other via a journal cross assembly. A journal cross assembly has a cross with four journals projecting from a base body. Two journals, respectively, are arranged in a centered manner in pairs on a common bearing axis. The journals are supported, via bearing arrangements, in the bearing bores of the yoke arms. Often rolling member bearings are used that are arranged in bearing bushes. The bearing bushes are accommodated in the bearing bores. The rolling members of a rolling member bearing roll on an inner bearing face, formed by the respective journals, and on an outer bearing face, formed by the bearing bush inserted in the bearing bore, or by the bearing bore itself. Zones of higher loading are produced during the transmission of torque from one of the two joint yokes to the other joint yoke. In this case, stiffer components of the yoke arms and areas with a larger lever arm of the torque transmission absorb a larger part of the loading. These zones of higher loading are arranged, relative to the axis of rotation, radially outwards, at the ends of the journals remote from the body of the journal.

DE 103 03 291 A1 discloses a cross to achieve a more constant load distribution. The inner bearing faces of at least two journals are arranged on a common journal axis and are represented, respectively, by an outer circumferential face of a journal or by an outer circumferential face of a bushing mounted on the journal. The inner bearing faces have, respectively, one first bearing face portion and a second bearing face portion. The first bearing face portion is arranged on a rotational symmetrical envelope face arranged coaxially to the respective journal axis. The second bearing face portion is arranged within the envelope face that extends in direction from the base body to the respective free end with a continuously decreasing distance to the respective journal axis. The second bearing face portion extends across a portion of the circumference of the respective journal.

The second bearing face portion extends in the axial direction in relation to the respective journal axis with a continuously decreasing distance to the journal axis. Thus, a load distribution of the bearing forces is ensured in the axial direction. Furthermore, the second bearing face portion extends only along a part of the outer circumferential face. Thus, a reduction of the maximum loadings is achieved in the main loading zone.

However, it is disadvantageous that the journal of the journal cross assembly has to undergo a relative cumbersome manufacturing process in order to form the corresponding bearing face portions.

DE 199 53 963 A1 discloses a solution where recesses are provided in the cylindrical wall of the bearing bores. The recesses extend along a portion of the circumference and have, in the axial direction of a journal axis, a varying depth. The journals of the cross are mounted in a bearing bush via rolling member bearings. The bearing bush is accommodated in the bearing bore. Thus, in the area of the recesses that are situated in the area of the main loading zone a deformation of the bearing bush occurs so that the maximum loadings are reduced.

DE 1 425 952 A1 illustrates a shaft to reduce the maximum loadings in a rolling member bearing. The shaft is oval in cross-section and is supported in a ring in a rolling member manner. In the area of the main loading zone, the shaft has the largest radius of curvature. Thus, the bearing load is distributed to more rolling member bodies than in an embodiment where the shaft is formed with a circular cross-section. The disadvantage is, however, that in the axial direction of the shaft no bearing load distribution is achieved.

DE 29 33 505 A1 illustrates a journal cross assembly with journals rollingly supported in bearing bushes. The bearing bushes are accommodated in bearing bores in the joint yokes. The outer circumferential faces of the bearing bushes are essentially cylindrical and have flatten areas in the area of the main loading zones. The flatten areas extend along a part of the circumference and in the direction of the journal axis. Starting from a base body where the journals are formed, the flatten areas approach in a direction to the respectively free end of the journal along the journal axis.

The bearing load distribution in the axial direction in relation to the journal axes DE 1 122 781 B shows a cross with journals. The outer circumferential face is conically formed. In this case, however, no bearing load distribution is achievable in the circumferential direction. Furthermore, the rolling member bodies are at low loading not abutting across their entire longitudinal extension the bearing face of the bearing bore.

BRIEF SUMMARY OF INVENTION

It is an object of the present disclosure to provide a universal joint yoke with increased life span.

The object is achieved by a joint yoke for a universal joint. The joint yoke includes a first yoke arm, with a first bearing bore, and a second yoke arm, with a second bearing bore. The first bearing bore and the second bearing bore are centered on a bearing axis. The bearing axis intersects the axis of rotation at a right angle at the joint center. The yoke arms have, radially to the axis of rotation, an outer portion and an inner portion, adjacent to the outer portion. The wall thickness of the yoke arms, in a radial direction to the bearing axis in a plane orthogonal to the axis of rotation and through the joint center, is reduced in the outer portion relative to the inner portion. The first and second yoke arms have at least two recesses that are arranged at opposite sides of the respective bearing bore. The recesses are arranged at least partially parallel to the axis of rotation.

By means of reducing the wall thickness of the yoke arms in the outer portions along the bearing bores, in relation to the axis of rotation, a relief of the support of the journals of a cross is achieved in these outer portions. The yoke arm is weakened in these areas of reduced wall thickness and is correspondingly more elastic. The Hertzian stress of the outer portions is reduced. Thus, the life span of the bearing of the joint yokes is over-proportionally increased. The inner portions along the bearing bores, in relation to the axis of rotation, are in contrast loaded higher. These inner portions are loaded less than the outer portions. Thus, a constant loading in the direction of the bearing axis is achieved. This leads to an improvement of the life span of the bearing apparatus.

Each yoke arm includes two recesses. These recesses are arranged on opposite sides of the respective bearing bore. The recesses extend parallel to each other and to the axis of rotation. The recesses are in a sense of the disclosure considered parallel to the axis of rotation or to each other. They are arranged slightly inclined to enable the manufacturing by a forging process. The recesses are arranged slightly at an angle to the axis of rotation and to each other. An angle deviation to the axis of rotation of up to 10 degrees is, thus, still considered to be parallel in the sense of the disclosure. This corresponds approximately to common forging inclinations.

Preferably, the wall thickness is reduced starting from a plane that is at least in an angle range of +/−45 degree around the bearing axis. The plane is arranged orthogonal to the axis of rotation and extends through the joint center.

According to a preferred embodiment, the wall thickness is not reduced in an outer portion along the bearing bores, arranged radially to the axis of rotation, at the free ends of the yoke arms. In other words, the wall thickness of the yoke arms is reduced, in a radial direction to the bearing axis, in a plane orthogonal to the axis of rotation and through the joint center in the outer portion relative to another outer portion in the area of free ends of the yoke arms, arranged radially to the axis of rotation, in a plane, that contains the axis of rotation and the bearing axis.

The outer portions along the bearing bores start, respectively, from an outer end of the bearing bores, relative to the axis of rotation and extend across a portion of the longitudinal extension of the bearing bores in direction to the axis of rotation. Following directly thereto are respectively the inner portions. The inner portions do not compulsorily extend up to the inner ends of the bearing bores. Thus, it is possible, that a portion, arranged totally inwards, is adjacent to the inner portion wherein the wall thickness of the totally inward portion can again be reduced relative to the inner portion.

The wall thickness of the yoke arms can be reduced along a large part of the circumference around the bearing bore. The reduction may be over more than half of the circumference around the bearing bores. The reduced portions can be split into at least two circumferential portions.

In one embodiment, the yoke arms have outwards recesses relative to the axis of rotation. The recesses extend along the longitudinal extension of the outer portions of the bearing bores. Thus, the wall thickness is reduced. The recesses are provided in outer surfaces of the yoke arms in relation to the axis of rotation.

The joint yokes can have a base portion. The yoke arms project parallel to each other from the base portion. The joint yoke has a recess preferably between the bearing axis and the base portion. The recess extends at least partially around the bearing axis, to reduce the wall thickness.

In another embodiment, the joint yoke is connected articulatedly, via a cross, to a second joint yoke. In this case, the second joint yoke can be a joint yoke as described above.

The wall thickness of the yoke arms is not reduced in the outer portion at the free ends of the yoke arms or no recess is provided there.

Further areas of applicability will become apparent from the description provided herein. The description and specific examples in this summary are intended for purposes of illustration only and are not intended to limit the scope of the present disclosure.

BRIEF DESCRIPTION OF THE SEVERAL VIEWS OF THE DRAWING

The drawings described herein are for illustrative purposes only of selected embodiments and not all possible implementations, and are not intended to limit the scope of the present disclosure.

FIGS. 8A and 8B are cross-sectional views through the yoke arm of a joint yoke in two embodiments wherein FIG. 8A shows a joint yoke according to the State of the Art and FIG. 8B-shows a joint yoke of FIG. 2.

DETAILED DESCRIPTION OF THE INVENTION

Example embodiments will now be described more fully with reference to the accompanying drawings.

Figure 1:
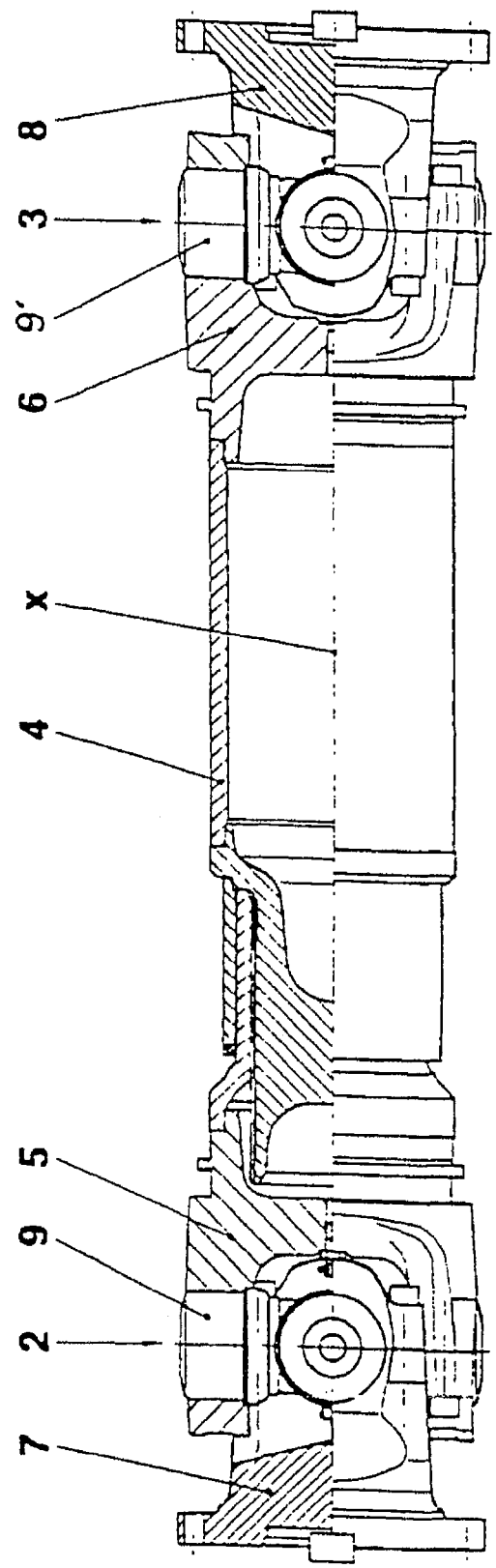
FIG. 1 is a half longitudinal sectional view of a universal joint shaft.

FIG. 1 shows a universal joint shaft 1 with two universal joints 2, 3 as well as a shaft 4 connecting the two universal joints 2, 3. The shaft 4 telescopes to enable a change of the distance between the two universal joints 2, 3. The two universal joints 2, 3 are aligned to be centered on an axis of rotation X. Each universal joint 2, 3 includes a first inner joint yoke 5, 6, in the form of a so-called tube yoke and a second outer joint yoke 7, 8 in the form of a so-called flange yoke. The inner joint yokes 5, 6 are respectively non-rotationally connected to the shaft 4. The outer joint yokes 7, 8 are also respectively non-rotationally connected to the shaft 4. A journal cross assembly 9, 9' pivotably connects the first joint yoke 5, 6 and the second joint yoke 7, 8 to each other.

The universal joint shaft of FIG. 1 is shown schematically. It has at least one joint yoke, which corresponds to the following first embodiment of FIGS. 2, 3 and 4 or to the following second embodiment of FIGS. 5, 6 and 7. A universal joint shaft can also have several joint yokes according to any one of the following embodiments. The following two embodiments of the joint yokes are formed as flange yokes. Thus, these can serve as outer second joint yokes 7, 8. In the following it is purely exemplary started from the fact, that the second joint yoke of the left shown universal joint is represented by one of the following embodiments. Obviously, also both outer or only the right outer joint yoke can be formed as described in the following. The joint yokes of the following embodiments can also be formed as tube yokes, i.e. first joint yokes. They can also comprise any combination of one of the following embodiments.

Figure 2:
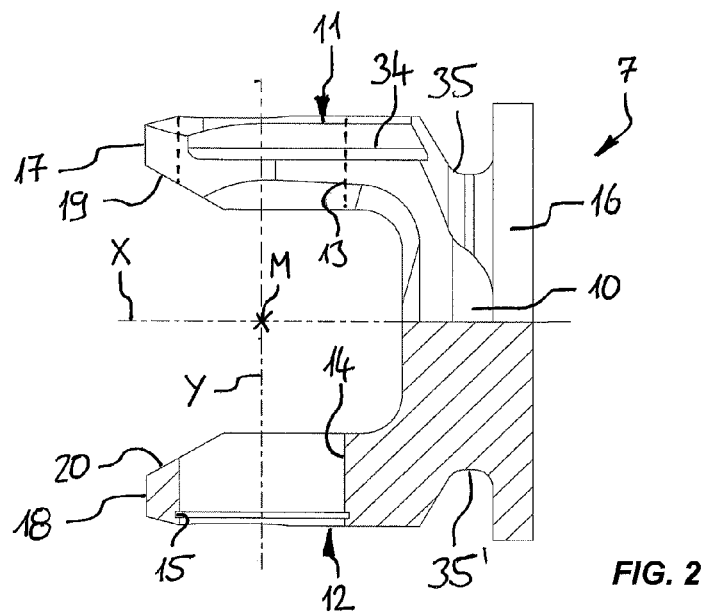
FIG. 2 is a half longitudinal sectional view of a first embodiment of a joint yoke.
Figure 3:
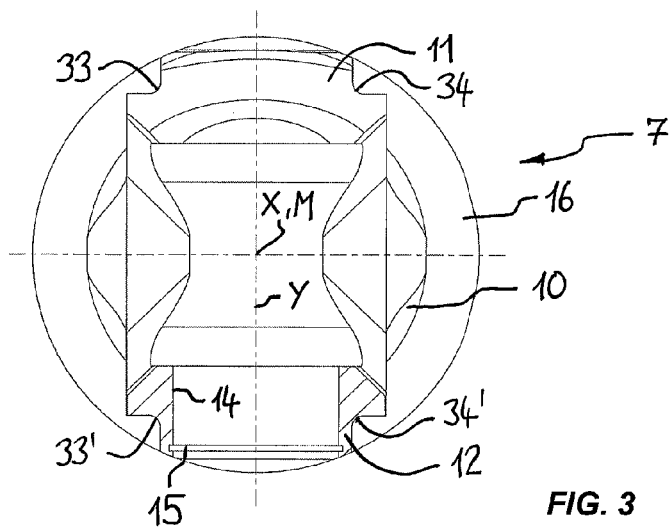
FIG. 3 is a partial cross-sectional view of the joint yoke of FIG. 2 along line 3-3.
Figure 4:
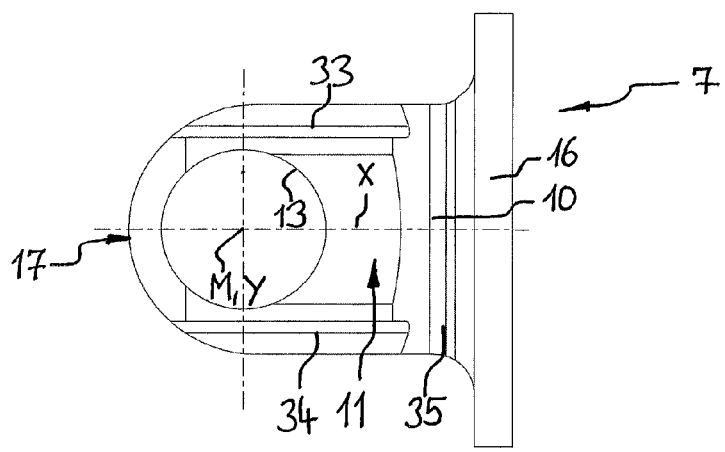
FIG. 4 is a side view of the joint yoke of FIG. 2.

FIGS. 2 to 4 show a first embodiment of a second joint yoke 7 in different views. FIG. 2 shows a partial longitudinal sectional view. FIG. 3 shows a partial cross-sectional view. FIG. 4 shows a side view of the second joint yoke 7. The second yoke 7 is rotatable around the axis of rotation X. It has a base portion 10 with a first yoke arm 11 and a second yoke arm 12. The arms 11, 12 project parallel to each other and parallel to the axis of rotation X. The first yoke arm 11 includes a first bearing bore 13. The second yoke arm 12 includes a second bearing bore 14. The two bearing bores 13, 14 are aligned centered on a common bearing axis Y. Thus, the bores 13, 14 are coaxially aligned to each other. The bearing axis Y is arranged at a right angle to the axis of rotation X and intersects it in a joint center M. The first bearing bore 13 and the second bearing bore 14 are formed as through bores. Thus, they extend in relation to the axis of rotation X in a radial direction through the respective yoke arms 11, 12. In the yoke arms 11, 12, as described in the following in more detail, a bearing bush 21 is inserted into the bores to support a journal of a cross. The bearing bush 21 is secured by a locking ring that rests in a locking groove 15 extending around the bearing axis Y.

On a side, facing away from the yoke arms 11, 12, the base portion 10 has a flange 16. The second joint yoke 7 can be connected to a to be driven or driving component by the flange 16. Generally, instead of a flange, a journal can also be provided that can be connected with a shaft component of a shaft of FIG. 1. Embodiments with journals are shown for example in FIGS. 11 through 14. The journals, shown there, can be provided in this or similar shape also in the other embodiments.

To be able to mount a cross, the cross 9 has journals projecting from a base body. The journals are arranged in pairs in a centered manner to each other and are aligned in opposite directions. The first yoke arm 11 has an inward facing first assembly recess 19 at a first free end 17. The second yoke arm 12 has an inward facing second assembly recess 20 arranged at a second free end 18. The two yoke arms 11, 12 are thus formed mirror-symmetrically to a plane that is arranged at a right angle to the bearing axis Y and contains the axis of rotation X. The assembly recesses 19, 20 enable only the insertion of a cross into the bearing bores 13, 14. A journal of the cross is initially passed through the first assembly recess 19 in an inclined manner and is then inserted into the first bearing bore 13. The journal is inserted into the first bearing bore 13 so deeply, that the opposite journal can be passed through the second assembly recess 20 till the opposite journal can be inserted, by displacement of the entire cross, into the second bearing bore 14. Then, the bearing bushes can be inserted from the outside into the bearing bores 13, 14 and can be secured by a locking ring that is inserted into the locking groove 15.

Figure 8A:
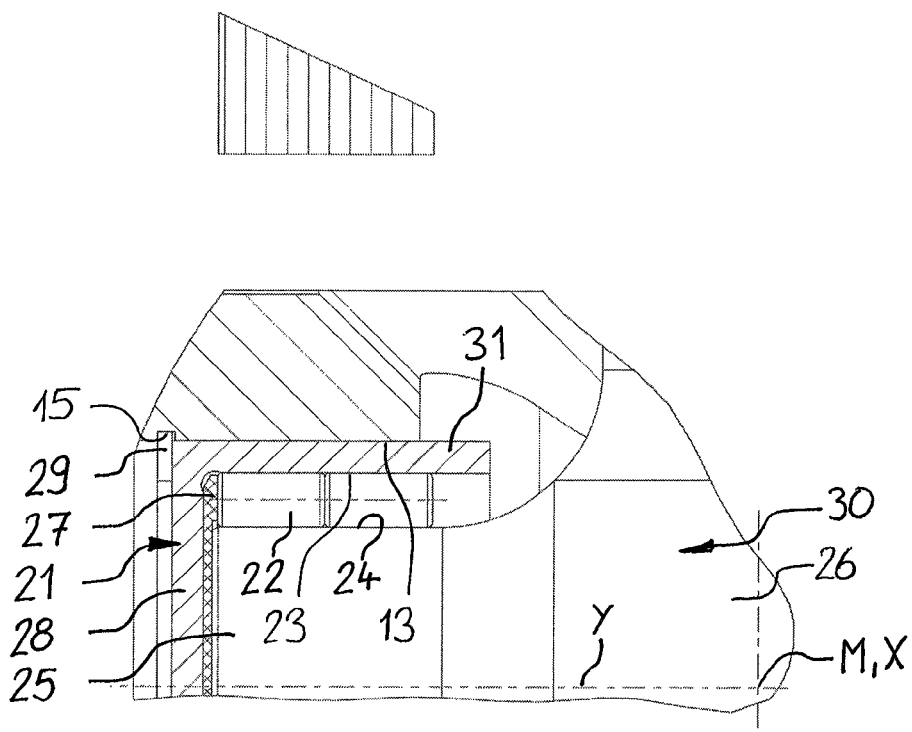
Figure 8B:
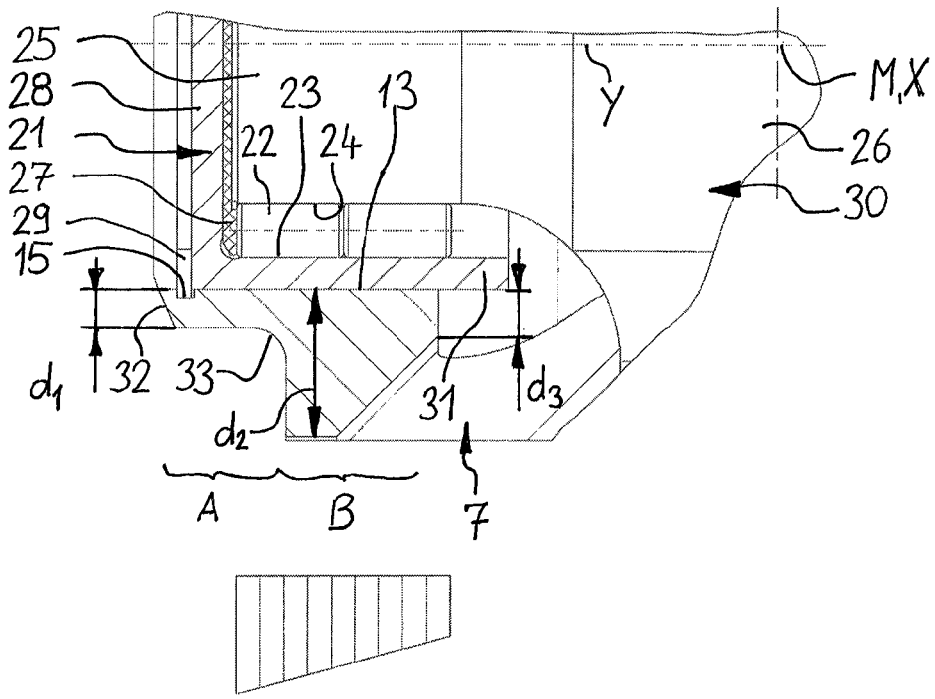

FIG. 8B shows a cross-sectional view through a first yoke arm 11 of the second yoke arm 7 of FIGS. 2 to 4 below the bearing axis Y. Y, FIG. 8A corresponds to a common joint yoke according to the State of the Art above the bearing axis Y.

FIGS. 8A and 8B show the first yoke arm 11 with the first bearing bore 13. A bearing bush 21 is inserted into the bearing bore 13. The bearing bush 21 accommodates several rolling members in form of rollers 22. The rollers 22 are arranged centrally to the axis of rotation X and are provided along the bearing axis Y in two rows. The rollers 22 roll on an outer bearing face 23 of the bearing bush 21. The rollers 22 roll on an inner bearing face 24 of a journal 25 of a journal cross 30. The cross 30 has a base body 26, from which four journals 25 project. Two journals are centered, respectively in pairs on a bearing axis Y and point away from each other.

The bearings bush 21 has a sleeve wall 31. The sleeve wall 31 is cylindrical formed. The bearing bush 21 is inserted into the first bearing bore 13. The inner face of the sleeve wall 31 forms the outer bearing face 23. The bearing bush 21 has a sleeve bottom 28 that closes the bearing bush 21 to the outside in relation to the joint center M. The bearing bush 21 is supported via the sleeve bottom 28 on a locking ring 29 that rests in the locking groove 15.

The rollers 22 roll in an axial relation to the bearing axis Y against a pressure plate 27 in the bearing bush 21. The pressure plate 27 is supported on the sleeve bottom 28. In the other direction, the rollers 22 are supported by a ring, not shown, and attached on the sleeve wall 31. Thus, the rollers 22 are held in the bearing bush 21. On this ring, generally, a sealing means is provided to seal the bearing bush 21 in direction to the base body 26 in relation to the cross 30. Because of reasons of clarity, neither the ring nor the sealing means are shown.

The journal is arranged facing away from the shown journal 25, in relation to the base body 26, correspondingly supported in the second yoke arm. The journals arranged vertically to the bearing axis Y, and are also not shown, are supported in corresponding bearing bores of a first joint yoke. Thus, a torque can be transmitted between the second joint yoke 7 and a first joint yoke. Thus, the universal joint shaft and the universal joint rotate around the axis of rotation X. In this case, forces are produced in the drawing plane of FIGS. 8A and 8B, which insofar as the first joint yoke is the driving element, act from the journal 25 onto the first yoke arm 11 and via the bearing, and also the bearing faces 23, 24 and the rollers 22. The bearing load of the embodiment of the second joint yoke 7 is shown in the lower half, below the representation of the joint yoke in form of a trapeze. The bearing load of a joint yoke according to the State of the Art is shown in FIG. 8A and FIG. 8B shows the joint yoke as a trapezoid.

Firstly it is recognizable, that the bearing load is the highest, radially outward, in relation to the axis of rotation X. Also, the lever arm is the largest for the force transmission. The bearing load decreases towards the inside. According to the State of the Art, it is recognizable, that the bearing load is significantly larger radially at the outside than the bearing load radially at the inside.

For homogenizing the bearing load according to the embodiment, a first recess 33 is provided in FIG. 8B in the outer surface 32 of the first yoke arm 11. In FIG. 4 it is visible, that the first recess 33 is arranged in relation to the axis of rotation X on one side of the first bearing bore 13 and extends parallel to the axis of rotation X. Furthermore, a second recess 34 is provided on the other side of the first bearing bore 13. It also extends parallel to the axis of rotation X. The recesses 33, 34 extend to a third recess 35. The third recess 35 extends partially around the axis of rotation X and is provided in the base body 10 between the first yoke arm 11 and the flange 16.

Due to the first recess 33 and the second recess 34, the wall thickness d1 is small in cross-section at a right angle to the axis of rotation X. The wall thickness d1 is in a plane orthogonal to the axis of rotation X and through the joint center M. This plane corresponds to the picture plane of FIG. 8, in the area of the recess 33, 34 of the first yoke arm 11, compared with a maximum wall thickness d2 in that area, which follows, in relation to the axis of rotation X, inwardly to the recesses 33, 34. The area of the recesses 33, 34 corresponds, in this case, to an outer portion A along the bearing bore in relation to the axis of rotation X. Attached thereto is an inner portion B along the bearing bore 13. The outer portions A along the bearing bores 13, 14 start, respectively, from an outer end of the bearing bores 13, 14, relative to the axis of rotation X and extend across a portion of the longitudinal extension of the bearing bores 13, 14 in direction to the axis of rotation X. The wall thickness of the yoke arms 11, 12 can be reduced along a large part of the circumference around the bearing bore 13, 14. The reduction may be over more than half of the circumference around the bearing bores 13, 14. The reduced portions can be split into at least two circumferential portions.

The wall thickness d1 in the outer portion A in the area of the recess 33, 34 is in the present preferred example, smaller than the maximum wall thickness of the residual inner portion B. The residual inner portion B follows inwardly from the recess 33, 34 and axially overlaps the rollers in relation to the bearing axis Y.

Thus, the first yoke arm 11 is weakened in the area of the recess 33, 34. Thus, in this area a higher elastic deformation of the first yoke arm 11 can take place and the bearing loads are reduced in this area. Correspondingly, the inner areas of the first yoke arm 11 have to absorb higher loads, so that the bearing load is increased here. This is evident in the not so steep trapeze, that reflects the bearing load in the lower half of the representation of FIG. 8. The highest produced bearing load is, thus, smaller and the smallest bearing load is higher compared to the State of the Art. Because of this, an increased life span of the bearing of the journal 25 in the first yoke arm 11 is achieved.

As visible in FIG. 4, the first recess 33 and the second recess 34 extend in a direction toward the flange 16 or to the base portion 10 at least so far, as the first bearing bore 13 extends in direction to the axis of rotation X in the side view of FIG. 4. In the present example, the recesses extend even further than the extension of the first bearing bore 13.

Figure 5:
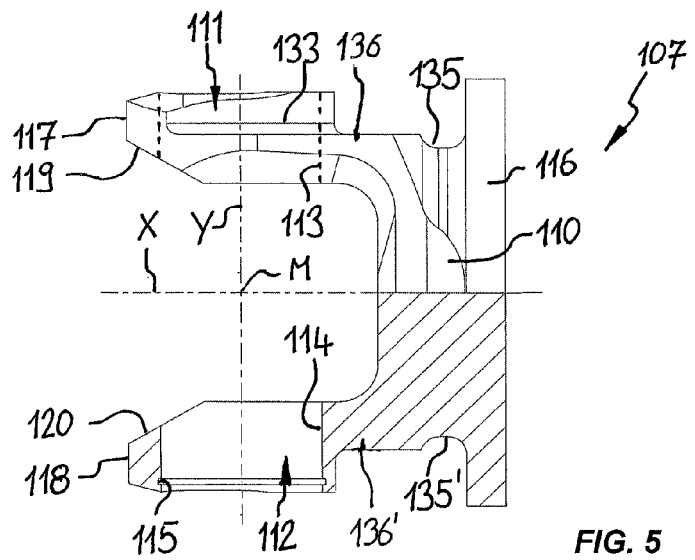
FIG. 5 is a partial longitudinal sectional view of a second embodiment of a joint yoke.
Figure 6:
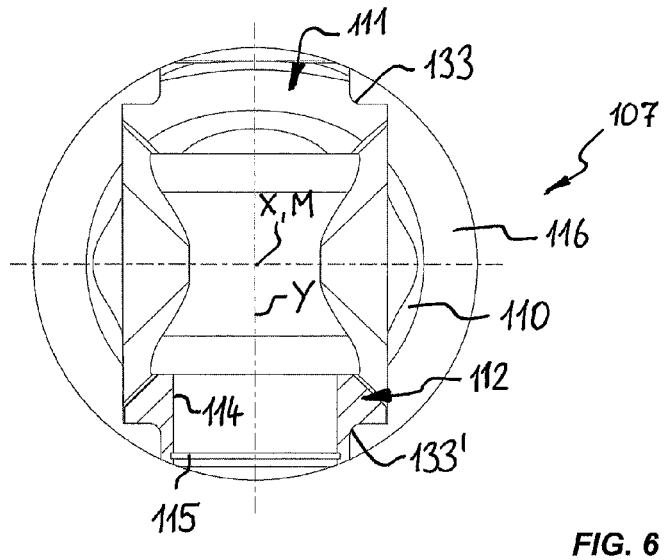
FIG. 6 is a partial cross-sectional view of the joint yoke of FIG. 5 along line 6-6.
Figure 7:
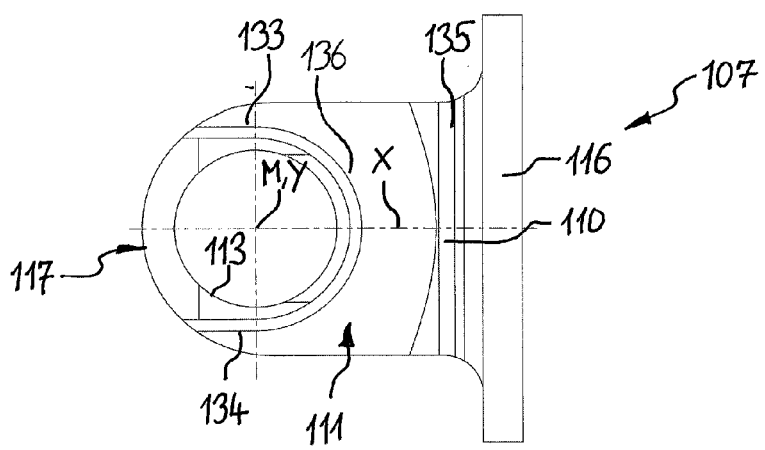
FIG. 7 is a side view of the joint yoke of FIG. 5.

FIGS. 5 to 7 show a second embodiment of the second joint yoke. Components or features, that correspond to the components or features of the first embodiment, are provided with reference numerals that are increased by the value 100 and are described in connection with the first embodiment.

In contrast to the first embodiment the two recesses 33, 34 are connected by a third recess 136, 136'. The third recess 136, 136' extends between the bearing axis Y and the base portion 10 partially around the bearing axis Y. Thus, it extends around the respective bearing bore 113, 114. The two yoke arms 111, 112 are arranged mirror-symmetrically to each other. The following presentably refers to the first yoke arm 111. The first recess 133 extends from the first free end 117 of the first yoke arm 111 in a direction to the base portion 110. The first recess 133 joins, in circumferential direction, the third recess 136. The third recess 136 extends around the first bearing bore 113. The third recess 136 merges into the second recess 134, which again leads to the first free end 117. Thus, the wall thickness is not only reduced in a cross-sectional plane at a right angle to the axis of rotation X, but also in the entire area between a plane, that is arranged at a right angle to the axis of rotation X and contains the bearing axis Y, and the base portion 110.

In all the embodiments, the wall thickness of the yoke arms is not reduced in the outer portion along the bearing bores at the free ends of the yoke arms or no recess is provided in this portion.

This type of design of the recess 133 is especially advantageous, when the second joint yoke 107 is formed as a forged part. The forging direction extends parallel to the bearing axis Y.

Figure 9:
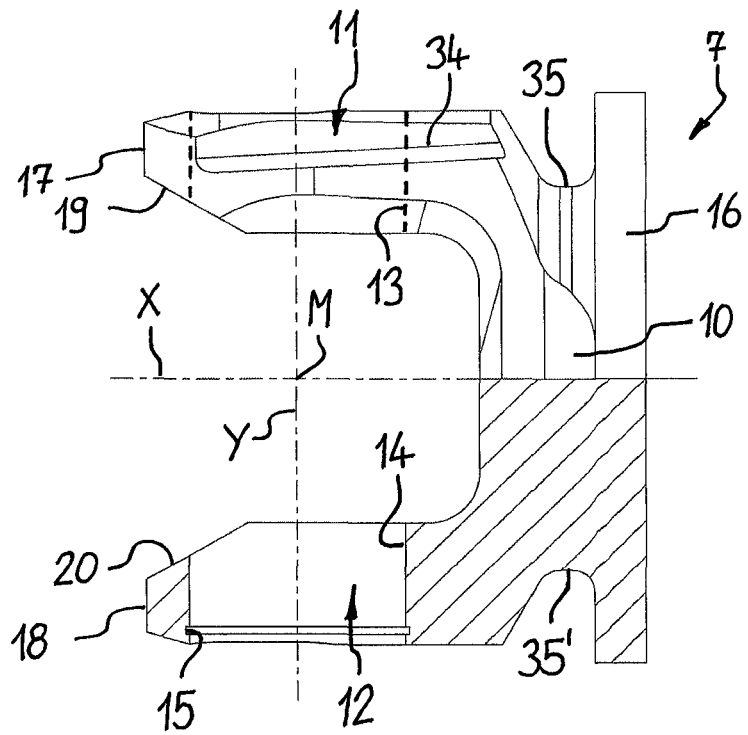
FIG. 9 is a half longitudinal sectional view of a third embodiment of a joint yoke of FIG. 2 as a forged part.
Figure 10:
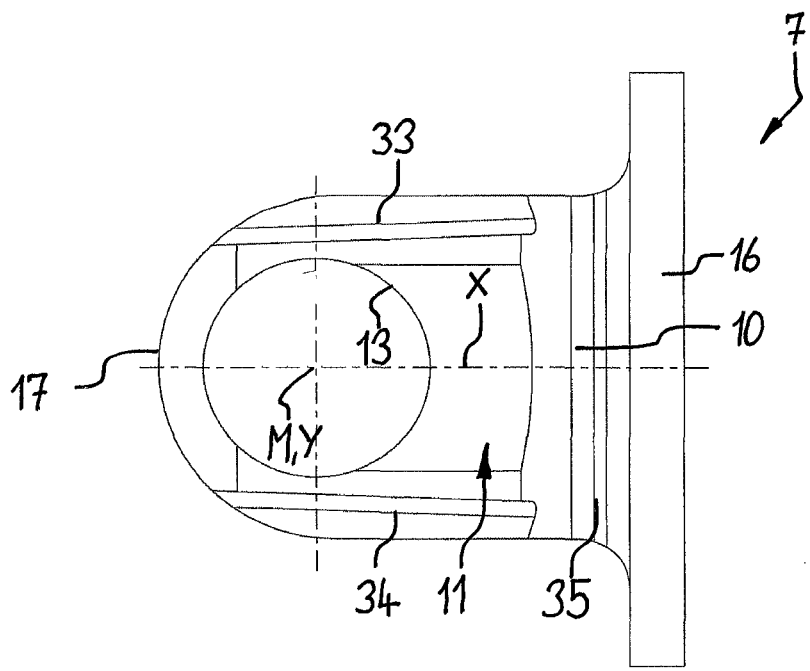
FIG. 10 is a side view of the joint yoke of FIG. 9.

FIGS. 9 and 10 show a third embodiment of a second joint yoke formed as a forged part. Components or features that correspond to components or features of the first embodiment are provided with the same reference numerals and are described in connection with the first embodiment.

The recesses 33, 34 are arranged inclined to the axis of rotation X. They are arranged on an imaginary envelope of a cone around the axis of rotation X. The envelope of the cone tapers towards the flange 16. The arrangement of the first and the second recesses 33, 34, approximately parallel to the axis of rotation, is especially suitable for joint yokes that are produced as forged parts. The forging direction extends parallel to the axis of rotation X.

Figure 11:
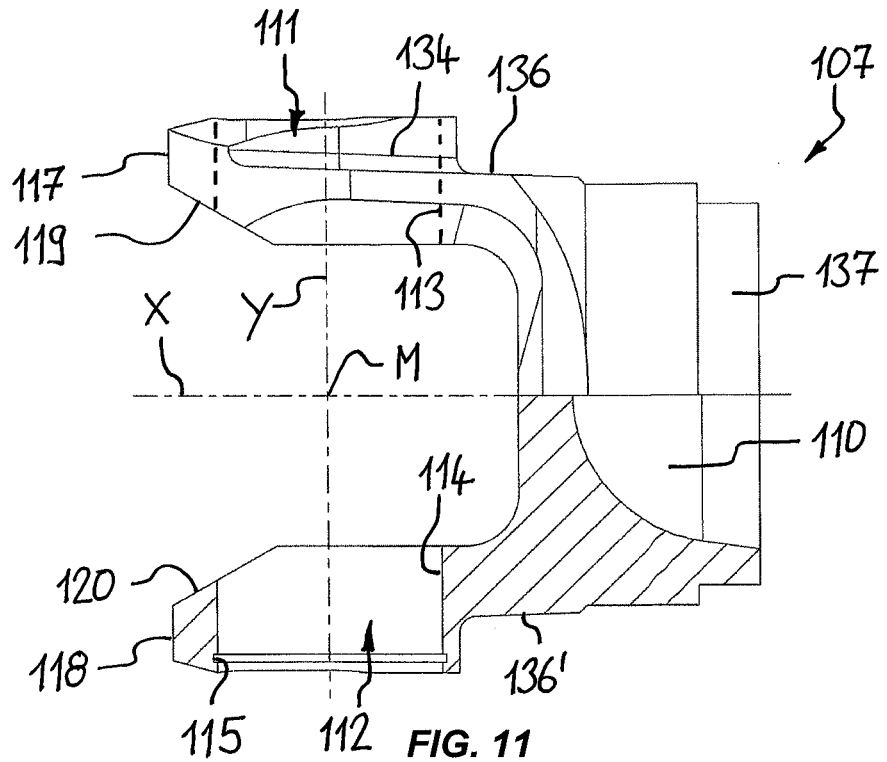
FIG. 11 is a half longitudinal sectional view of a fourth embodiment of a joint yoke of FIG. 5 as a forged part.
Figure 12:
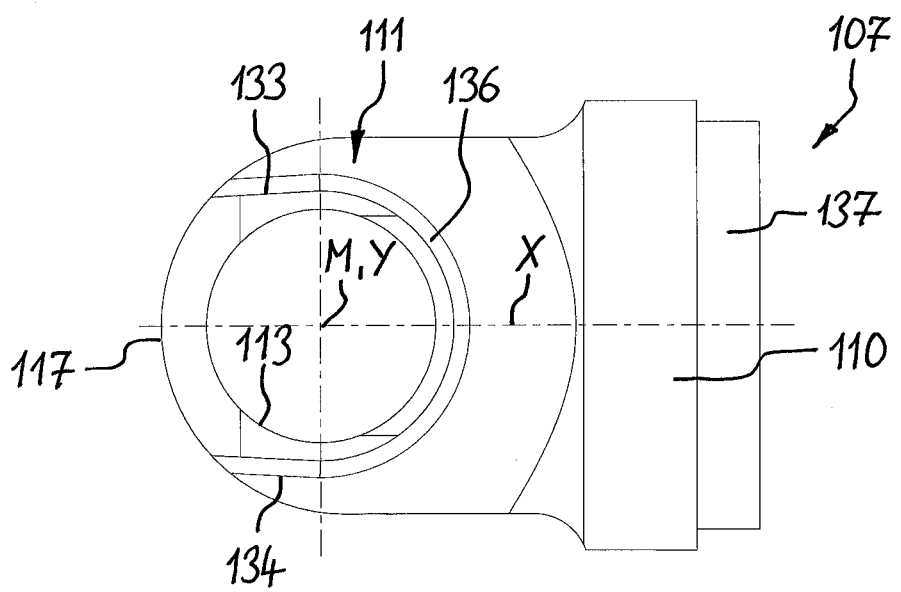
FIG. 12 is a side view of the joint yoke of FIG. 11.

FIGS. 11 and 12 show a fourth embodiment of a second joint yoke that is formed as a forged part. Components or features that correspond to the components or features of the second embodiment are provided with the same reference numerals and are described in connection with the second embodiment.

The recesses 133, 134 are arranged inclined to the axis of rotation X. They are arranged on an imaginary envelope of a cone around the axis of rotation X. The envelope of the cone is tapered towards the journal 116. The arrangement of the first and second recesses 133, 134, approximately parallel to the axis of rotation, is especially suitable for joint yokes that are produced as forged parts. The forging direction extends parallel to the axis of rotation X. The second joint yoke 107 has no flange. A journal 137 is present to connect to an element of a shaft.

Figure 13:
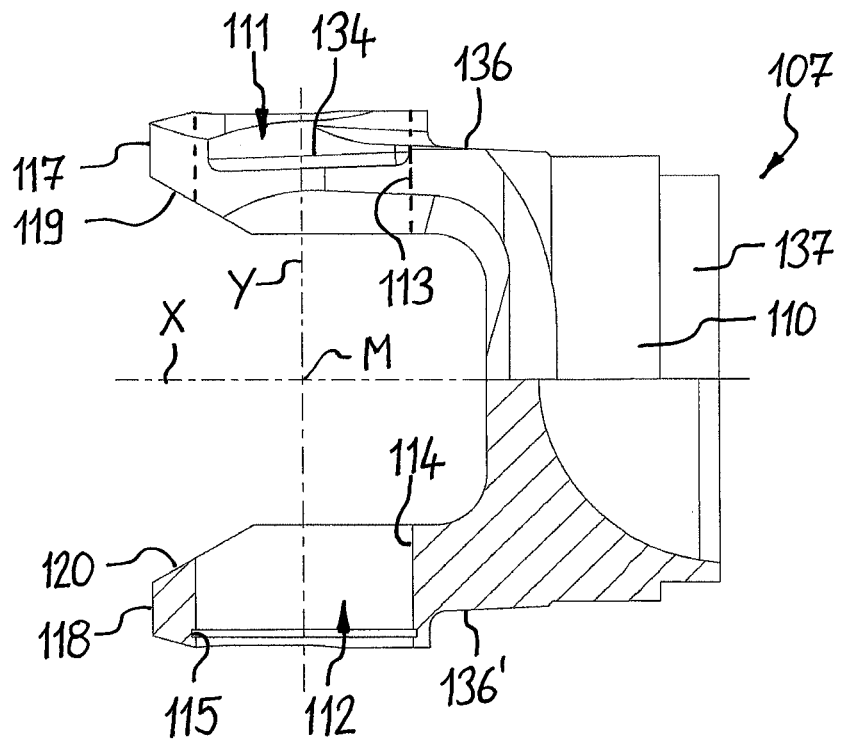
FIG. 13 is a half longitudinal sectional view of a fifth embodiment of a joint yoke.
Figure 14:
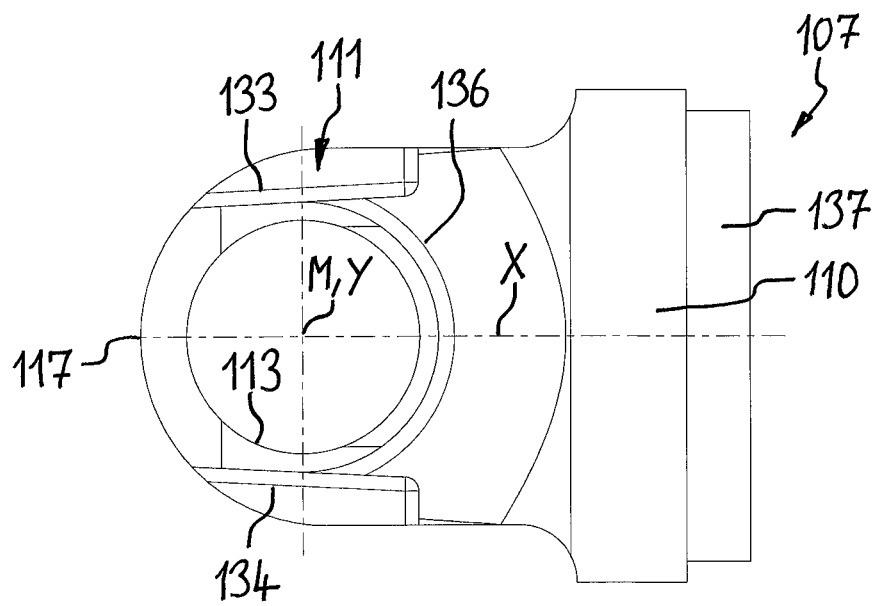
FIG. 14 is a side view of the joint yoke of FIG. 13.

FIGS. 13 and 14 show a fifth embodiment of a second joint yoke that is formed as a forged part. Components or features that correspond to components or features of the fourth embodiment are provided with the same reference numerals and are described in connection with the fourth or the second embodiment.

The first, second and third recesses 133, 134, 136 are arranged such, that they are especially suitable for a forged part. The forging direction extends transversally to the axis of rotation X.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A joint yoke for a universal joint, the joint yoke being rotatably drivable around an axis of rotation, the joint yoke comprising:
   a first yoke arm with a first bearing bore; and
   a second yoke arm with a second bearing bore, the first bearing bore and the second bearing bore being arranged centered on a bearing axis, the bearing axis intersecting the axis of rotation at a right angle at a joint center,
   wherein the first and second yoke arms, radially to the axis of rotation, include an outer portion and an inner portion adjacent to the outer portion,
   wherein the first and second yoke arms each have at least two recesses that are arranged at opposite sides of the respective bearing bore such that a wall thickness of the yoke arms, in a radial direction to the bearing axis in a plane orthogonal to the axis of rotation and through the joint center, is reduced in the outer portion relative to the inner portion,
   wherein the recesses being arranged at least partially parallel to the axis of rotation and
   wherein the wall thickness of the yoke arms is reduced in a radial direction to the bearing axis in a plane orthogonal to the axis of rotation and through the joint center in the outer portion relative to an outer portion in an area of free ends of the yoke arms arranged radially to the axis of rotation, in a plane, that contains the axis of rotation and the bearing axis.

2. The joint yoke according to claim 1, wherein the outer portions extend, respectively, from an outer end of the bearing bores in a direction to the axis of rotation.

3. The joint yoke according to claim 1, wherein the wall thickness of the yoke arms is reduced across at least half of the circumference around the bearing bores.

4. The joint yoke according to claim 1, wherein the yoke arms have, relative to the axis of rotation, outward recesses which extend along the longitudinal extension of the outer portions of the bearing bores.

5. The joint yoke according to claim 1, wherein the joint yoke has a base portion, from which the yoke arms project parallel to each other, and a third recess, the third recess being provided between the bearing axis and the base portion and extending at least partially around the bearing axis.

6. A universal joint with a joint yoke according to claim 1, wherein the joint yoke is connected articulatedly via a cross to a second joint yoke.

7. A universal joint comprising:
   a first joint yoke and a second joint yoke,
   wherein the first joint yoke is connected articulatedly via a cross to the second joint yoke and
   wherein the first and second joint yokes are joint yokes according to claim 1.

* * * * *